United States Patent [19]

Hauge

[11] 4,029,743

[45] June 14, 1977

[54] PHOSPHORIC ACID MANUFACTURE

[76] Inventor: Douglas O. Hauge, 930 Acalanes Road, Lafayette, Calif. 94549

[22] Filed: Dec. 24, 1975

[21] Appl. No.: 644,106

[52] U.S. Cl. .............................. 423/320; 423/167; 423/319; 423/311; 423/555

[51] Int. Cl.² ...................... C01B 25/22

[58] Field of Search .......... 423/167, 320, 319, 311, 423/555

[56] References Cited

UNITED STATES PATENTS

| 2,013,970 | 9/1935 | Moore | 423/320 |
|---|---|---|---|
| 2,531,977 | 11/1950 | Hammaren et al. | 423/320 |
| 3,097,922 | 7/1963 | Beetz | 423/320 |
| 3,401,014 | 9/1968 | Saeman | 423/307 |
| 3,418,077 | 12/1968 | Robinson | 423/167 |
| 3,442,610 | 5/1969 | Mustian et al. | 423/167 |
| 3,552,918 | 11/1966 | Fitch et al. | 423/370 |
| 3,919,395 | 11/1975 | Hauge | 423/167 |

FOREIGN PATENTS OR APPLICATIONS

| 1,933,692 | 1/1970 | Germany | 423/320 |

Primary Examiner—Herbert T. Carter
Assistant Examiner—Eugene T. Wheelock

[57] ABSTRACT

A process is described for producing high purity phosphoric acid from phosphate rock including low grade phosphate rock material such as Idaho phosphate ores having $P_2O_5$ contents as low as 20 percent. Finely divided phosphate rock, sulfuric acid, phosphoric acid and water are charged to a mixing zone in proportions such that the pH of the resultant slurry is in the range 0.8 to 1.2 and the calcium ion content of the liquid phase of the slurry is in the range 3 to 4 percent by weight. Sulfuric acid is charged to the mixing zone in a quantity sufficient to convert the nonphosphate calcium compounds in the rock to calcium sulfate plus the quantity required to convert the contained calcium phosphate to monocalcium phosphate, phosphoric acidis charged to the mixing zone in quantities such that it is, on a molar basis, from about 1.2 to about 1.4 times the $P_2O_5$ content of the phosphate rock and water is charged to the mixing zone in amount equal to from about 80 to about 90 percent by weight of the phosphate rock charged. The slurry formed in the mixing zone is removed and filtered to separate the calcium sulfate filter cake and a filtrate comprising monocalcium phosphate. In a second mixing zone, the filtrate is mixed with a quantity of sulfuric acid stoichio-metrically sufficient to convert the monocalcium phosphate contained in the filtrate to phosphoric acid and calcium sulfate. The slurry from the second mixing zone is passed into a settling zone. A portion of the contained phosphoric acid is removed as a product from the upper part of the settling zone and a slurry of calcium sulfate and phosphoric acid is returned to the first mixing zone. The returned slurry has a phosphoric acid content sufficient to supply the required quantity of phosphoric acid to the first mixing zone.

3 Claims, 1 Drawing Figure

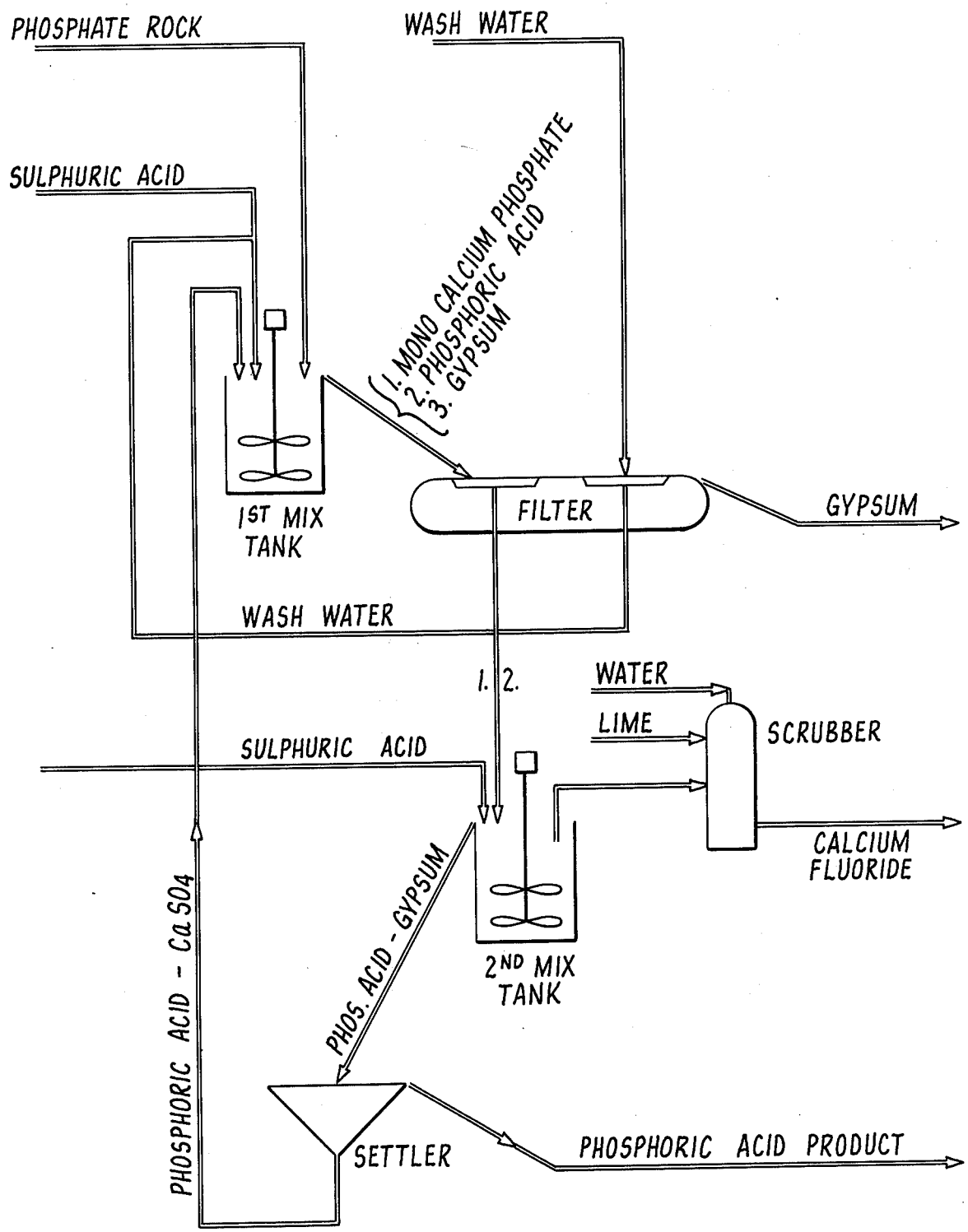

PHOSPHORIC ACID MANUFACTURE

BACKGROUND OF THE INVENTION

Wet processes for producing phosphoric acid by acid treating phosphate rock first appeared about a hundred years ago. Over the years numerous improvements and refinements in wet processing having appeared. Many of these are described in Phosphoric Acid edited by A. V. Slack (Marcel Dekker, Inc., New York, 1968). Wet process production of phosphoric acid appears to have been focused on the treatment of high grade phosphate rock and relatively little experience appears to have been reported on the handling of low grade phosphate rock, i.e., phosphate rock having relatively low $P_2O_5$ content of the order of 20 percent by weight and relatively high content of acid soluble materials such as iron oxide and aluminum oxide which are precursors of undesired impurities in the product acid.

BRIEF DESCRIPTION OF THE INVENTION

Pursuant to the invention, finely divided phosphate rock which may be very low grade phosphate rock, sulfuric acid, phosphoric acid and water are slurried in a first mixing zone. The quantity of sulfuric acid charged to the first mixing zone is an amount sufficient stoichiometrically to convert contained calcium phosphate to monocalcium phosphate plus an amount sufficient to convert other contained calcium compounds to calcium sulfate. The quantity of phosphoric acid charged to the first mixing zone is, on a molar basis, from about 1.2 to 1.4 times the $P_2O_5$ content of the rock. Quantity of water charged to the first mixing zone is a quantity in the range about 80 to 90 percent of the rock phosphate charged. The resultant slurry is characterized by a pH from about 0.8 to 1.2 and by a calcium ion content in the liquid portion of the slurry from about 3 to 4 percent by weight. Slurry is continuously withdrawn from the first mixing zone and passed into a filter zone where a filter cake comprising calcium sulfate and gangue and a filtrate comprising monocalcium phosphate are separated. The filtrate is passed into a second mixing zone and there mixed with a quantity of sulfuric acid stoichiometrically sufficient to convert the monocalcium phosphate to phosphoric acid and calcium sulfate. The slurry of calcium sulfate in phosphoric acid formed in the second mixing zone is then passed into a settling zone to settle the calcium sulfate. Phosphoric acid product is decanted from the upper part of the settling zone and a slurry of calcium sulfate in phosphoric acid is withdrawn from the lower part of the settling zone and passed into the first mixing zone. The quantity of product phosphoric acid withdrawn from the settling zone is so adjusted that the slurry of calcium sulfate in phosphoric acid returned from the lower part of the settling zone to the first mixing zone will have a sufficient phosphoric acid content to supply the phosphoric charge requirement of the first mixing zone.

DETAILED DESCRIPTION OF THE INVENTION

The appended drawing is a labeled flow sheet diagrammatically illustrating the various vessels, all of which are conventional, employed in the process and having labeled connecting lines between the several vessels which indicate the materials carried in the lines. There is a gaseous effluent consisting principally of carbon dioxide and water vapor which is conducted away from the first mix tank by means not shown and either vented to the atmosphere or scrubbed in a caustic scrubber prior to venting. Pump means (not shown) are employed where necessary to move materials through the lines from one vessel to another.

EXAMPLE

Phosphoric acid was produced by the process of the invention from Idaho phosphate ore having the following composition:

| | |
|---|---|
| $P_2O_5$ | 20.5% |
| Fluorine | 1.8% |
| CaO | 24.5% |
| $Fe_2O_3$ | 4.0% |
| $Al_2O_3$ | 1.0% |
| MgO | 1.1% |

1,000 parts by weight of the Idaho phosphate ore, 284 parts by weight of sulfuric acid, 193 parts by weight of phosphoric acid and 850 parts by weight of water were charged to the first mixing zone. At start up, all of these materials are fed to the first mixing zone from an outside source but when steady state operation has been achieved, the phosphoric acid is recycle acid supplied from the lower part of the settler and carrying with it calcium sulfate in slurried form. Also, when steady state operation is achieved, water is supplied to the first mixing zone from the filter in the form of wash water used to wash the filter cake. The monocalcium phosphate containing filtrate from the filter zone is passed into the second mix tank and there contacted and mixed with 214 parts by weight of sulfuric acid. Fumes produced in the second mix tank include hydrogen fluoride and these fumes are passed into the scrubber where they are contacted with water containing 12 parts by weight of calcium oxide suspended in it. 8 parts by weight of calcium fluoride are removed from the scrubber. 714 parts by weight of phosphoric acid having a $P_2O_5$ content of 28 percent by weight are withdrawn from the upper part of the settler. A filter cake is removed from the filter which contains 840 parts by weight of calcium sulfate dihydrate plus the gangue from the phosphate rock.

The several quantities indicated above are parts by weight per hour charged or produced, as the case may be, during steady state operation.

The product phosphoric acid has the following composition:

| | |
|---|---|
| $P_2O_5$ | 28% |
| $Fe_2O_3$ | 0.12% |
| $Al_2O_3$ | 0.04% |
| MgO | 0.6% |
| $CaF_2$ | 0.2% |

It is clear that a very good quality phosphoric acid product is obtained from a low grade phosphate rock.

The calcium sulfate formed in the second mix tank is a very high quality calcium sulfate which may be recovered as a saleable product, if desired. In the event that it is desired to recover this calcium sulfate, then the settler is replaced by a filter from which a calcium sulfate filter cake is withdrawn and the phosphoric acid filtrate is then split into two parts, one of which is taken as the process product and the other of which is returned to the first mixing zone.

While the precise chemistry of a wet phosphoric acid process is more than somewhat elusive, it is believed that the relatively high pH and the high calcium ion content maintained in the first mixing zone are necessary to achieve the high product quality obtained. The dissolution of the iron, aluminum and fluorine impurities in the phosphate rock is not favored by the high pH and the bulk of these impurities remain in the gangue and are disposed of in the filter cake. Further, the maintenance of moderate temperature below 140° F. and preferably in the range 120° to 130° F. in the first mixing zone contributes to product purity by holding down the rate of dissolution of aluminum, iron and fluorine containing components of the phosphate rock.

I claim:
1. A process for producing phosphoric acid from rock phosphate which comprises
   a. continuously feeding finely divided rock phosphate, sulfuric acid, phosphoric acid and water to a first mixing zone and mixing them to form a slurry,
   b. the quantity of sulfuric acid charged being about equal to the quantity stoichiometrically required to convert the calcium phosphate contained in the phosphate rock to monocalcium phosphate and other contained calcium compounds to $CaSO_4$, the quantity of phosphoric acid charged being on a molar basis from about 1.2 to 1.4 times the $P_2O_5$ content of the rock and the quantity of water charged being equal to 80 to 90 percent by weight of the rock phosphate charged whereby the slurry is characterized by a pH in the range 0.8 to 1.2 and by a calcium ion content in the liquid portion of the slurry about 3–4 percent by weight,
   c. continuously withdrawing slurry from said first mixing zone and passing it into a filter zone to separate a filter cake comprising calcium sulfate and a filtrate comprising monocalcium phosphate,
   d. passing the filtrate into a second mixing zone and there mixing it with a quantity of sulfuric acid stoichiometrically sufficient to convert the contained monocalcium phosphate to phosphoric acid and calcium sulfate,
   e. continuously withdrawing phosphoric acid and calcium sulfate from the second mixing zone and passing them into a settling zone,
   f. withdrawing product phosphoric acid from the upper portion of the settling zone,
   g. withdrawing a slurry of calcium sulfate in phosphoric acid from the lower portion of the settling zone and returning it to the first mixing zone.

2. A process as defined in claim 1 wherein the slurry withdrawn from the settling zone is filtered to separate a calcium sulfate product and a filtrate which is returned to the first mixing zone.

3. A process as defined in claim 1 wherein the temperature of the first mixing zone is maintained in the range 120° to 130° F.

* * * * *